US012639325B2

(12) United States Patent
Taggar et al.

(10) Patent No.: US 12,639,325 B2
(45) Date of Patent: May 26, 2026

(54) BACKEND SERVICE CALL SUPPRESSION VIA DATA VIEW ELIGIBILITY MATRIX

(71) Applicant: BANK OF AMERICA CORPORATION, Charlotte, NC (US)

(72) Inventors: Sanchit Taggar, New Delhi (IN); Saurabh Arora, New Palam Vihar (IN); Sandeep Kumar Chauhan, Hyderabad (IN); Bhagya Lakshmi Sudha Lavanya Mallidi, Hyderabad (IN); Puneetha Polasa, Secunderabad (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 24 days.

(21) Appl. No.: 18/937,979

(22) Filed: Nov. 5, 2024

(65) Prior Publication Data

US 2026/0127188 A1     May 7, 2026

(51) Int. Cl.
*G06F 16/248* (2019.01)
*G06F 16/2453* (2019.01)
*G06F 16/2455* (2019.01)

(52) U.S. Cl.
CPC ...... *G06F 16/248* (2019.01); *G06F 16/24535* (2019.01); *G06F 16/24556* (2019.01)

(58) Field of Classification Search
None
See application file for complete search history.

(56) References Cited

U.S. PATENT DOCUMENTS

| | | | |
|---|---|---|---|
| 7,783,655 B2 | 8/2010 | Barabas | |
| 9,513,876 B2 | 12/2016 | Bordeau | |
| 10,043,030 B1 | 8/2018 | Kruse | |
| 10,402,901 B2 | 9/2019 | Courbage | |
| 10,740,422 B2 | 8/2020 | Chan | |
| 10,831,757 B2 | 11/2020 | Petschulat | |
| 11,132,360 B2 | 9/2021 | Halstead | |
| 11,720,598 B2 | 8/2023 | Cialdea, Jr. | |
| 2008/0201339 A1 | 8/2008 | McGrew | |
| 2009/0204565 A1 | 8/2009 | Kanamatareddy | |
| 2010/0083147 A1 | 4/2010 | Gaffney | |
| 2010/0185618 A1 | 7/2010 | Peterson | |
| 2011/0213789 A1 | 9/2011 | Doshi | |
| 2012/0254053 A1* | 10/2012 | Joa .......................... | G06F 16/215 |
| | | | 707/732 |
| 2014/0201190 A1 | 7/2014 | Ebenstein | |
| 2015/0278315 A1 | 10/2015 | Baumgartner | |
| 2018/0129697 A1* | 5/2018 | Mullins ............... | G06F 16/2365 |

(Continued)

*Primary Examiner* — Yu Zhao
(74) *Attorney, Agent, or Firm* — Moore & Van Allen PLLC; Nicholas C. Russell

(57) ABSTRACT

A data activity application, which, based on user-selected view eligibility rules, which may user-configurable via a data view eligibility matrix, determines which Systems of Record (SORs) to retrieve data from and, in response to data retrieval, subsequently aggregates the data from those SORs and presents the aggregated view of the data to the user. Since only those SORs that meet the user-selected view eligibility rules are subject to back-end network calls for purpose of data retrieval, performance, and capacity issues, otherwise experienced when the data activity application is configured to conduct back-end network calls to all available SORs for each user, are lessened.

20 Claims, 6 Drawing Sheets

(56)  References Cited

U.S. PATENT DOCUMENTS

| | | | |
|---|---|---|---|
| 2020/0201840 A1 | 6/2020 | Pfeiffer | |
| 2020/0401613 A1* | 12/2020 | Rogynskyy | .......... G06Q 10/107 |
| 2021/0065016 A1 | 3/2021 | Riemer | |
| 2021/0294849 A1 | 9/2021 | Talbot | |
| 2023/0017196 A1 | 1/2023 | Jain | |
| 2024/0143665 A1 | 5/2024 | Siswanto | |
| 2024/0211630 A1 | 6/2024 | Guenther | |

* cited by examiner

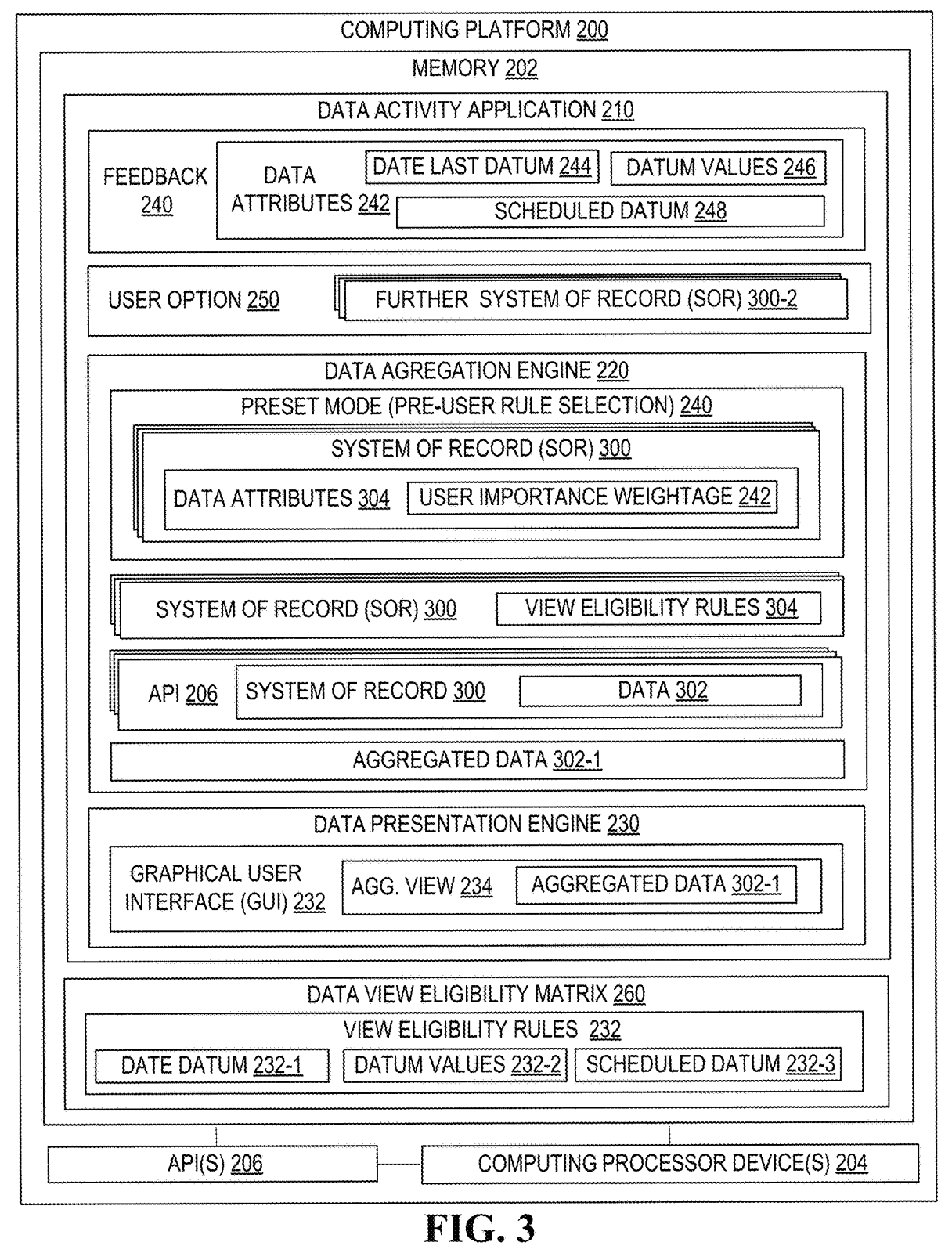

COMPUTING PLATFORM 200

MEMORY 202

DATA ACTIVITY APPLICATION 210

FEEDBACK 240 | DATA ATTRIBUTES 242 | DATE LAST DATUM 244 | DATUM VALUES 246
SCHEDULED DATUM 248

USER OPTION 250 | FURTHER SYSTEM OF RECORD (SOR) 300-2

DATA AGREGATION ENGINE 220

PRESET MODE (PRE-USER RULE SELECTION) 240

SYSTEM OF RECORD (SOR) 300

DATA ATTRIBUTES 304 | USER IMPORTANCE WEIGHTAGE 242

SYSTEM OF RECORD (SOR) 300 | VIEW ELIGIBILITY RULES 304

API 206 | SYSTEM OF RECORD 300 | DATA 302

AGGREGATED DATA 302-1

DATA PRESENTATION ENGINE 230

GRAPHICAL USER INTERFACE (GUI) 232 | AGG. VIEW 234 | AGGREGATED DATA 302-1

DATA VIEW ELIGIBILITY MATRIX 260

VIEW ELIGIBILITY RULES 232

DATE DATUM 232-1 | DATUM VALUES 232-2 | SCHEDULED DATUM 232-3

API(S) 206 | COMPUTING PROCESSOR DEVICE(S) 204

FIG. 3

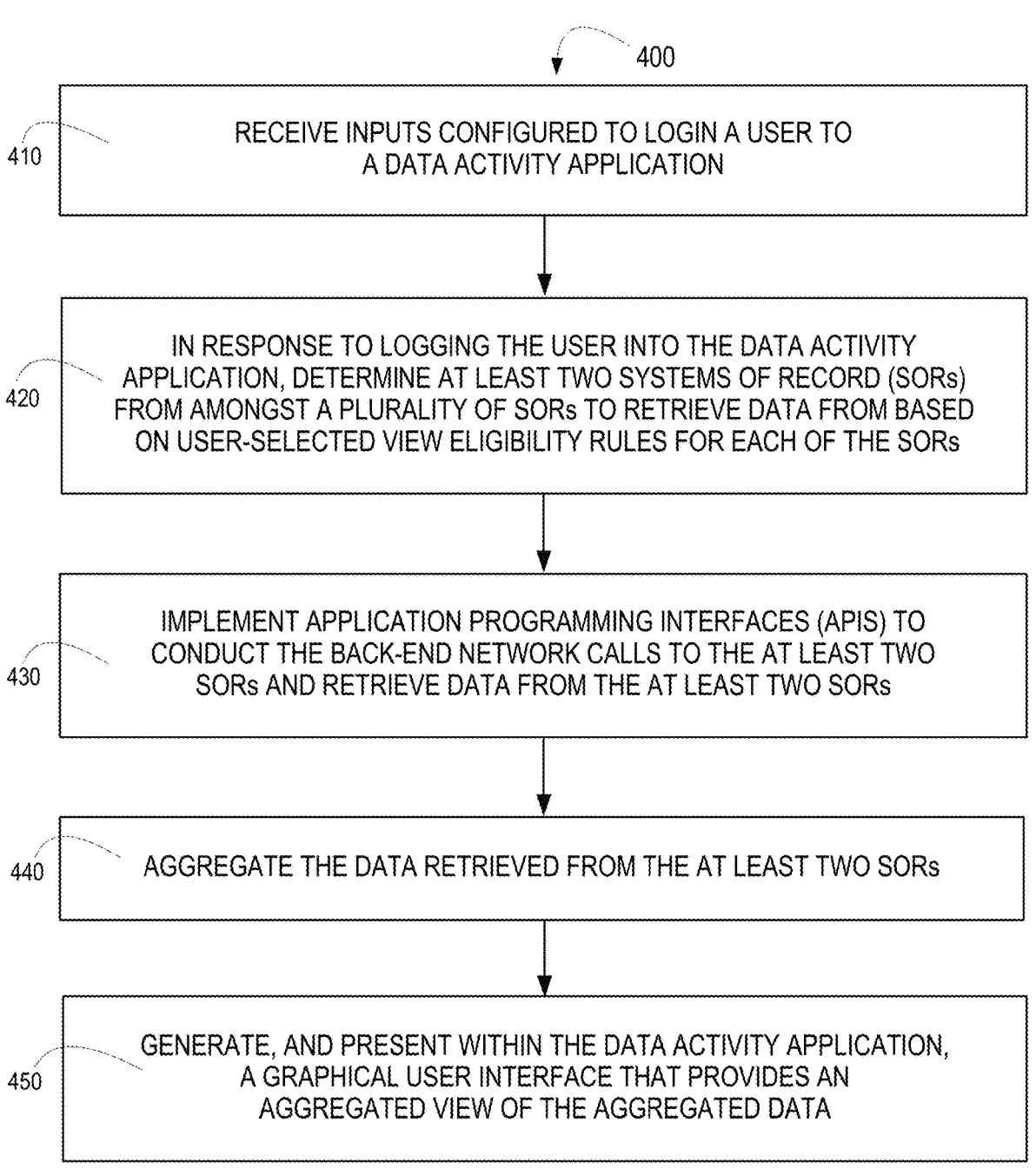

400

410    RECEIVE INPUTS CONFIGURED TO LOGIN A USER TO
A DATA ACTIVITY APPLICATION

420    IN RESPONSE TO LOGGING THE USER INTO THE DATA ACTIVITY
APPLICATION, DETERMINE AT LEAST TWO SYSTEMS OF RECORD (SORs)
FROM AMONGST A PLURALITY OF SORs TO RETRIEVE DATA FROM BASED
ON USER-SELECTED VIEW ELIGIBILITY RULES FOR EACH OF THE SORs

430    IMPLEMENT APPLICATION PROGRAMMING INTERFACES (APIS) TO
CONDUCT THE BACK-END NETWORK CALLS TO THE AT LEAST TWO
SORs AND RETRIEVE DATA FROM THE AT LEAST TWO SORs

440    AGGREGATE THE DATA RETRIEVED FROM THE AT LEAST TWO SORs

450    GENERATE, AND PRESENT WITHIN THE DATA ACTIVITY APPLICATION,
A GRAPHICAL USER INTERFACE THAT PROVIDES AN
AGGREGATED VIEW OF THE AGGREGATED DATA

FIG. 6

BACKEND SERVICE CALL SUPPRESSION VIA DATA VIEW ELIGIBILITY MATRIX

FIELD OF THE INVENTION

The present invention is generally directed to data communication and presentation and, more specifically, suppressing back-end network calls by implementing user-specific view eligibility rules that dictate which Systems of Record (SORs) receive such calls for data retrieval purposes.

BACKGROUND

For data coming from various Systems of Record (SORs) to be aggregated and subsequently presented to a user in aggregated view form, back-end network calls need be conducted, via an Application Programming Interface (API) or the like, in order to retrieve the request data. In certain instances, such as when a high volume of users are simultaneously requesting real-time data aggregation and presentation of the resulting aggregated view, performance and capacity issues may result from such requests requiring a corresponding high volume of back-end network calls to the SORs.

This problem is exasperated in those instances in which the data sources/SORs are numerous and the application does not otherwise take into account the user's need to view all of the data. In this regard, when a request to aggregate and view data is received from a user, applications do not assess the current level of importance that a user places on the data coming from each individual data source/SOR.

Therefore, a need exists to develop systems, computer-implemented methods, computer program products or the like that serve to provide a more efficient means for data retrieval, aggregation, and presentation. In this regard, the desired systems and the like should suppress the volume of back-end network calls required to retrieve data from numerous data sources/SORs, so as to alleviate performance and capacity issues associated with high volume network calls.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for a data activity application, which, based on user-selected view eligibility rules, determines which Systems of Record (SORs) to retrieve data from and, in response to data retrieval, subsequently aggregates the data from those SORs and presents the aggregated view of the data to the user. In this regard, since only those SORs that meet the user-selected view eligibility rules are subject to back-end network calls for purpose of data retrieval, performance and capacity issues, otherwise experienced when the data activity application is configured to conduct back-end network calls to all available SORs for each user, are lessened.

The invention relies on a view eligibility matrix stored in the user settings of the data activity application, which lists all of the available SORs and the selectable view eligibility rules associated with each available SORs. In this regard, users may engage one or more of the view eligibility rules to provide criteria as when data should be retrieved from a SOR (and subsequently aggregated and presented in aggregated view to the user. In specific instances, the view eligibility rules may re related to one or more of (i) last date data was created, (ii) minimum requirements as data value, and (iii) scheduled/recurring generation of data and the like.

In addition, the user may be provided with override options in which the user selects from those SORs that have otherwise been excluded from data retrieval based on application of the view eligibility rules and, in response to selection, such data is retrieved from such SORs and included in the data aggregation and subsequent aggregated view presentation. In addition, machine learning may be implemented to learn, over time, user patterns in selecting override options and the user patterns may be the basis for retrieving data from those SORs included in the user pattern (and included such retrieved data in the data aggregation and subsequent presentation of the aggregated view).

In addition, prior to the user selecting view eligibility rules for each SOR, the invention may provide for user-specific system-configured settings, in which system-configured SORs are selected/preset based on the importance weighting of data attributes (i.e., which data is deemed to be of most importance/significance to the user).

In specific embodiments of the invention, the data activity application is a financial payment activity center application configured to present a user an aggregated view of payment activity from a plurality of SORs associated with different payment channels. In such embodiments of the invention, the view eligibility rules may be stored in the user settings of the financial payment activity center application in the form of a view eligibility matrix that lists all of the different available payment channels and selectable rules for each payment channels. In specific embodiments of the invention, the rules for each payment channel may include, but are not limited to, last payment transaction exceeding a specified past date/number of days, payment transaction(s) falling below a predetermined transaction value, payment transactions limited to recurring/scheduled payments and the like.

A system for data aggregation and presentation defines first embodiments of the invention. The system includes a computing platform having a memory and one or more computing processor devices in communication with the memory. The memory stores a data activity application executable by at least one of the one or more computing processor devices, configured to provide a user access to user-specific data from various different Systems of Record (SORs). The data activity application includes a data aggregation engine that is executable by at least one of the one or more computing processor devices. The data aggregation is configured to, in response to the user logging into the data activity application, determine at least two Systems of Record (SORs) from amongst a plurality of SORs for conducting back-end network calls and data retrieval based on user-selected view eligibility rules for each of the plurality of SORs, implement Application Programming Interfaces (APIs) to conduct the back-end network calls to the at least two SORs and retrieve data from the at least two SORs, and, in response, aggregate the data retrieved from the at least two SORs.

The data activity application additionally includes a data presentation engine in communication with the data aggregation engine that is executable by at least one of the one or more computing processor devices. The data presentation engine is configured to receive the aggregated data from the data aggregation engine, and generate, and present within the data activity application, a graphical user interface that provides an aggregated view of the aggregated data.

In specific embodiments of the invention, the data activity application is configured to maintain a data view eligibility matrix within each user setting storage that allows for the user to select the applicable view eligibility rules for each of the plurality of SORs. In this regard, the view eligibility rules will vary on user-basis as well as an SOR-basis.

In further specific embodiments of the invention, the user-selected view eligibility rules include view eligibility rules directed to (i) date of last datum occurrence, (ii) value of datums over a predetermined time period, and (iii) scheduled occurrence of datums over the predetermined time period. In such embodiments of the invention, the data activity is configured to continually receive feedback from the plurality of SORs, which includes data attributes that provide for or otherwise indicate (i) the date of last datum occurrence, (ii) the value of the datums over the predetermined time period, and (iii) the scheduled occurrence of the datums over the predetermined time period for each of the plurality of SORs. In this regard, the data aggregation engine is able to ascertain whether the SOR meets requisite user-selected view eligibility rules.

In further embodiments of the system, the data aggregation engine is further configured to, prior to the user selecting view eligibility rules, determine at least two system-configured SORs from amongst the plurality SORs for conducting back-end network calls and data retrieval based, at least on, user expected importance weightage assigned to the data attributes, implement Application Programming Interfaces (APIs) to conduct back-end network calls to the at least two system-configured SORs and retrieve data from the at least two system-configured SORs, and aggregate the data retrieved from the at least two system-configured SORs. In such embodiments of the system, the data aggregation engine is operating in a preset mode (i.e., prior to receiving user-selected view eligibility rules) and retrieving, aggregating, and presenting data from SORs that the data activity application has determined that the user is likely to deem as important.

In further specific embodiments of the system, the data activity application is further configured to present the user with an override option to select one or more further SORs (i) from amongst the plurality of SORs and (ii) not including the at least two SORs. In response to the user selecting the one or more further SORs, the data aggregation engine is configured to implement Application Programming Interfaces (APIs) to conduct further back-end network calls to the one or more further SORs and retrieve data from the one or more further SORs, and aggregate the data retrieved from (i) the at least two SORs and (ii) one or more further SORs. In this regard, even though one or more of the SORs do meet the user's view eligibility rules, the user may override the rules and choose to have certain data from selected SORs presented within the aggregated view. In related embodiments of the system, the data activity application further comprises machine learning techniques that are configured to learn, over time, a user pattern of selection of one or more further SORs. In response to learning a user pattern, the data aggregation engine is further configured to receive the user pattern, and, in response to the user logging into the data activity application, implement Application Programming Interfaces (APIs) to conduct further back-end network calls to the one or more further SORs in the user pattern and retrieve data from the one or more further SORs in the user pattern, and aggregate the data retrieved from (i) the at least two SORs and (ii) one or more further SORs in the user pattern. In this regard, data is retrieved from further SORs in the user pattern (absent user selection of the further SORs), aggregated with the data from the SORs that meet the user's view eligibility rules and presented in aggregated view to the user.

A computer-implemented method for data aggregation and presentation defines second embodiments of the invention. The computer-implemented is method is executed by one or more computing processor devices. The computer-implemented method includes receiving inputs configured to login a user to a data activity application and, in response to logging the user into the data activity application, determining at least two Systems of Record (SORs) from amongst a plurality of SORs for conducting back-end network calls and data retrieval based on user-selected view eligibility rules for each of the plurality of SORs. In addition, the computer-implemented method includes implementing Application Programming Interfaces (APIs) to conduct the back-end network calls to the at least two SORs and retrieve data from the at least two SORs and aggregating the data retrieved from the at least two SORs. Further, the computer-implemented method includes generating, and presenting within the data activity application, a graphical user interface that provides an aggregated view of the aggregated data.

In specific embodiments of the computer-implemented method, determining at least two SORs further comprises accessing, within a user setting storage, a data view eligibility matrix to determine the view eligibility rules for each of the plurality of SORs based on user-selected settings in the data view eligibility matrix.

In further specific embodiments of the computer-implemented method, the user-selected view eligibility rules include view eligibility rules directed/pertaining to (i) date of last datum occurrence for a specified SOR, (ii) value of datums over a predetermined time period for a specified SOR, and (iii) scheduled occurrence of datums over the predetermined time period for a specified SOR. In related embodiments the computer-implemented method further includes continually receiving feedback from the plurality of SORs, which includes data attributes that provide for or otherwise indicate (i) the date of last datum occurrence, (ii) the value of the datums over the predetermined time period, and (iii) the scheduled occurrence of the datums over the predetermined time period.

In further embodiments the computer-implemented method includes, prior to the user selecting view eligibility rules, determining at least two system-configured SORs from amongst the plurality SORs for conducting back-end network calls and data retrieval based, at least on, user expected importance weightage assigned to the data attributes, implementing Application Programming Interfaces (APIs) to conduct back-end network calls to the at least two system-configured SORs and retrieve data from the at least two system-configured SORs, and aggregating the data retrieved from the at least two system-configured SORs. In such embodiments of the computer-implemented method, in a preset mode (i.e., prior to receiving user-selected view eligibility rules) data is retrieved and aggregated (and subsequently presented to the user) from SORs that the have determined as having data that the user is likely to deem as important.

In still further embodiments the computer-implemented method includes receiving a user input that selects one or more further SORs (i) from amongst the plurality of SORs and (ii) not included in the at least two SORs, implementing Application Programming Interfaces (APIs) to conduct further back-end network calls to the one or more further SORs and retrieve data from the one or more further SORs, and aggregating the data retrieved from (i) the at least two SORs and (ii) one or more further SORs. In this regard, even though one or more of the SORs do meet the user's view eligibility rules, the user may override the rules and choose to have certain data from selected SORs (i.e., so-called further SORs) presented within the aggregated view. In related embodiments the computer-implemented method includes implementing machine learning techniques to learn, over time, a user pattern of selection of one or more further SORs, and, in response to logging the user into the data activity application, implementing Application Programming Interfaces (APIs) to conduct further back-end network calls to the one or more further SORs in the user pattern and retrieve data from the one or more further SORs in the user pattern and aggregating the data retrieved from (i) the at least two SORs and (ii) one or more further SORs in the user pattern. In this regard, data is retrieved from further SORs in the user pattern (absent user selection of the further SORs), aggregated with the data from the SORs that meet the user's view eligibility rules and presented in aggregated view to the user.

A computer program product including a non-transitory computer-readable medium defines third embodiments of the invention. The non-transitory computer-readable medium includes sets of codes. The sets of codes cause one or more computing devices to receive inputs configured to login a user to a data activity application and, in response to logging the user into the data activity application, determine at least two Systems of Record (SORs) from amongst a plurality of SORs for conducting back-end network calls and data retrieval based on user-selected view eligibility rules for each of the plurality of SORs. In response to determining the two or more SORs, the sets of codes cause the computing device(s) to implement Application Programming Interfaces (APIs) to conduct the back-end network calls to the at least two SORs and retrieve data from the at least two SORs and, in response, aggregate the data retrieved from the at least two SORs. In addition, the sets of codes cause the computing device(s) to generate, and present within the data activity application, a graphical user interface that provides an aggregated view of the aggregated data.

In specific embodiments of the computer program product, the set of codes for causing the one or more computing devices to determine at least two SORs are further configured to cause the one or more computing devices to access, within a user setting storage, a data view eligibility matrix to determine the view eligibility rules for each of the plurality of SORs based on user-selected settings in the data view eligibility matrix.

In other specific embodiments of the computer program product, the user-selected view eligibility rules include view eligibility rules directed to (i) date of last datum occurrence, (ii) value of datums over a predetermined time period, and (iii) scheduled occurrence of datums over the predetermined time period.

In further specific embodiments of the computer program product, the sets of codes further include a set of codes for causing the computer device(s) to, prior to the user selecting view eligibility rules, determine at least two system-configured SORs from amongst the plurality SORs for conducting back-end network calls and data retrieval based, at least on, user expected importance weightage assigned to the data attributes, implement Application Programming Interfaces (APIs) to conduct back-end network calls to the at least two system-configured SORs and retrieve data from the at least two system-configured SORs, and aggregate the data retrieved from the at least two system-configured SORs.

In still further specific embodiments of the computer-program product, the sets of codes further include sets of codes for causing the computing device(s) to receive a user input that selects one or more further SORs (i) from amongst the plurality of SORs and (ii) not included in the at least two SORs, and implement Application Programming Interfaces (APIs) to conduct further back-end network calls to the one or more further SORs and retrieve data from the one or more further SORs. In such embodiments of the computer program product, the set of codes for causing the one or more computing devices to aggregate are further configured to cause the one or more computing devices to aggregate the data retrieved from (i) the at least two SORs and (ii) the one or more further SORs. Moreover, in additional related specific embodiments of the computer program product, the sets of codes further include sets of codes for causing the one or more computing devices to implement machine learning techniques to learn, over time, a user pattern of selection of one or more further SORs, and in response to logging the user into the data activity application, implement Application Programming Interfaces (APIs) to conduct further back-end network calls to the one or more further SORs in the user pattern and retrieve data from the one or more further SORs in the user pattern. In such embodiments of the computer program product, the set of codes for causing the one or more computing devices to aggregate are further configured to cause the one or more computing devices to aggregate the data retrieved from (i) the at least two SORs and (ii) one or more further SORs in the user pattern.

Thus, as described in detail below, present embodiments of the invention include apparatus, methods, computer program products and/or the like that provide for a data activity application, which, based on user-selected view eligibility rules, determines which data sources/Systems of Record (SORs) to retrieve data from and, in response to data retrieval, subsequently aggregates the data from those SORs and presents the aggregated view of the data to the user. In this regard, since only those SORs that meet the user-selected view eligibility rules are subject to back-end network calls for purpose of data retrieval, performance and capacity issues, otherwise experienced when the data activity application is configured to conduct back-end network calls to all available SORs for each user, are lessened. The invention relies on a view eligibility matrix stored in the user settings of the data activity application, which lists all of the available SORs and the selectable view eligibility rules associated with each available SORs. In this regard, users may engage one or more of the view eligibility rules to provide criteria as when data should be retrieved from a SOR (and subsequently aggregated and presented in aggregated view to the user. In specific instances, the view eligibility rules may be related to one or more of (i) last date data was created, (ii) minimum requirements as data value, and (iii) scheduled/recurring generation of data and the like.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
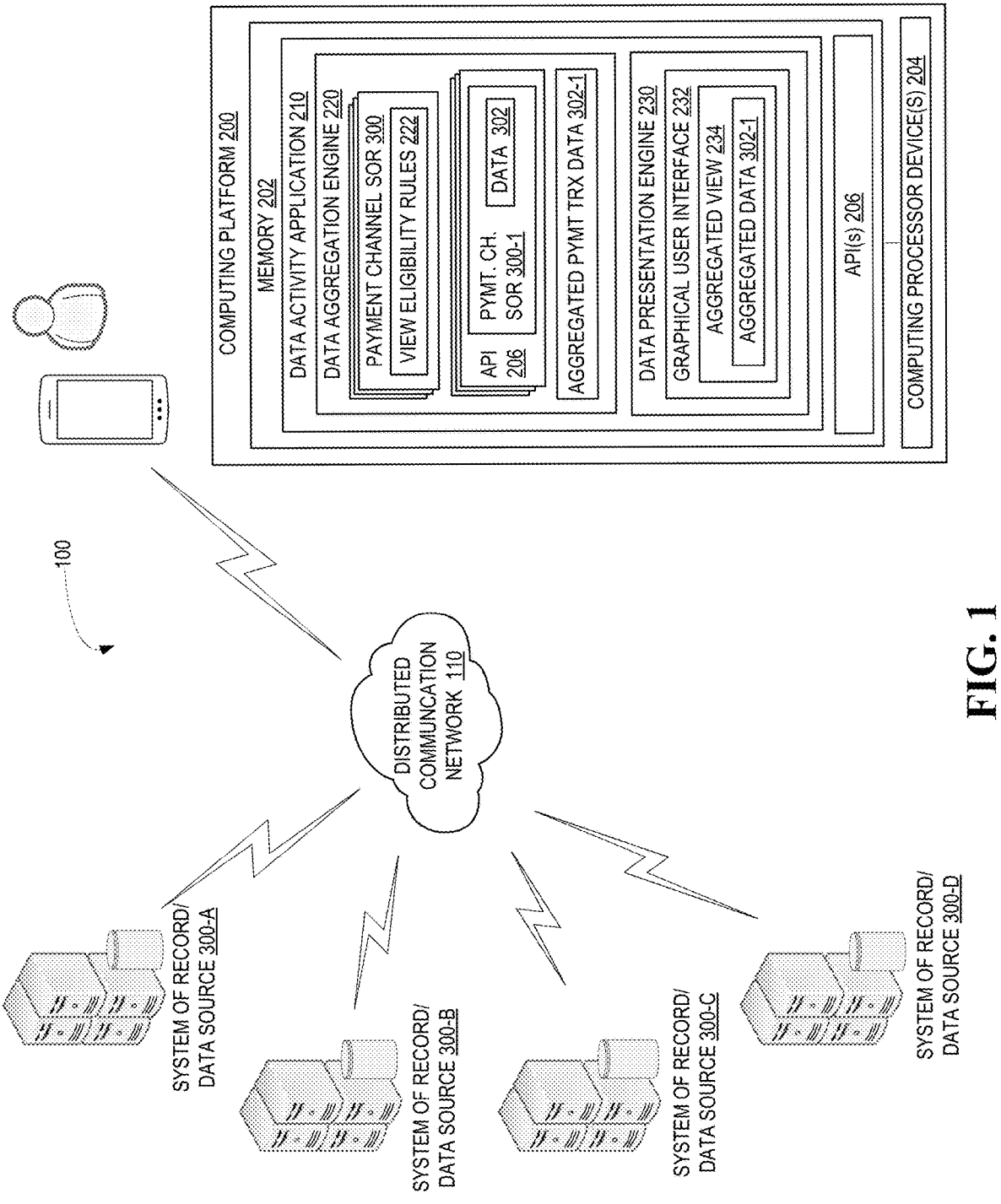
Figure 2:
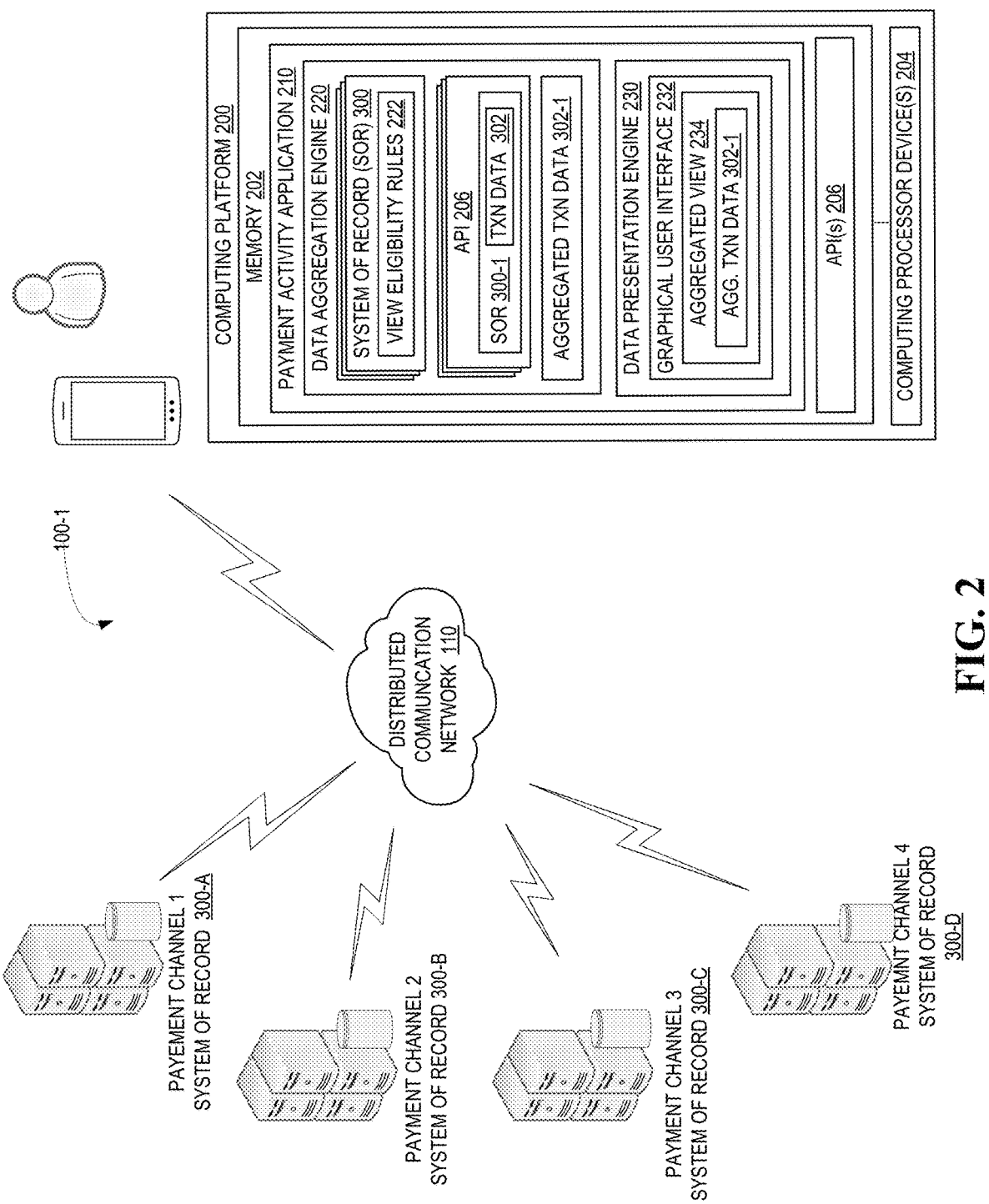
Figure 4:
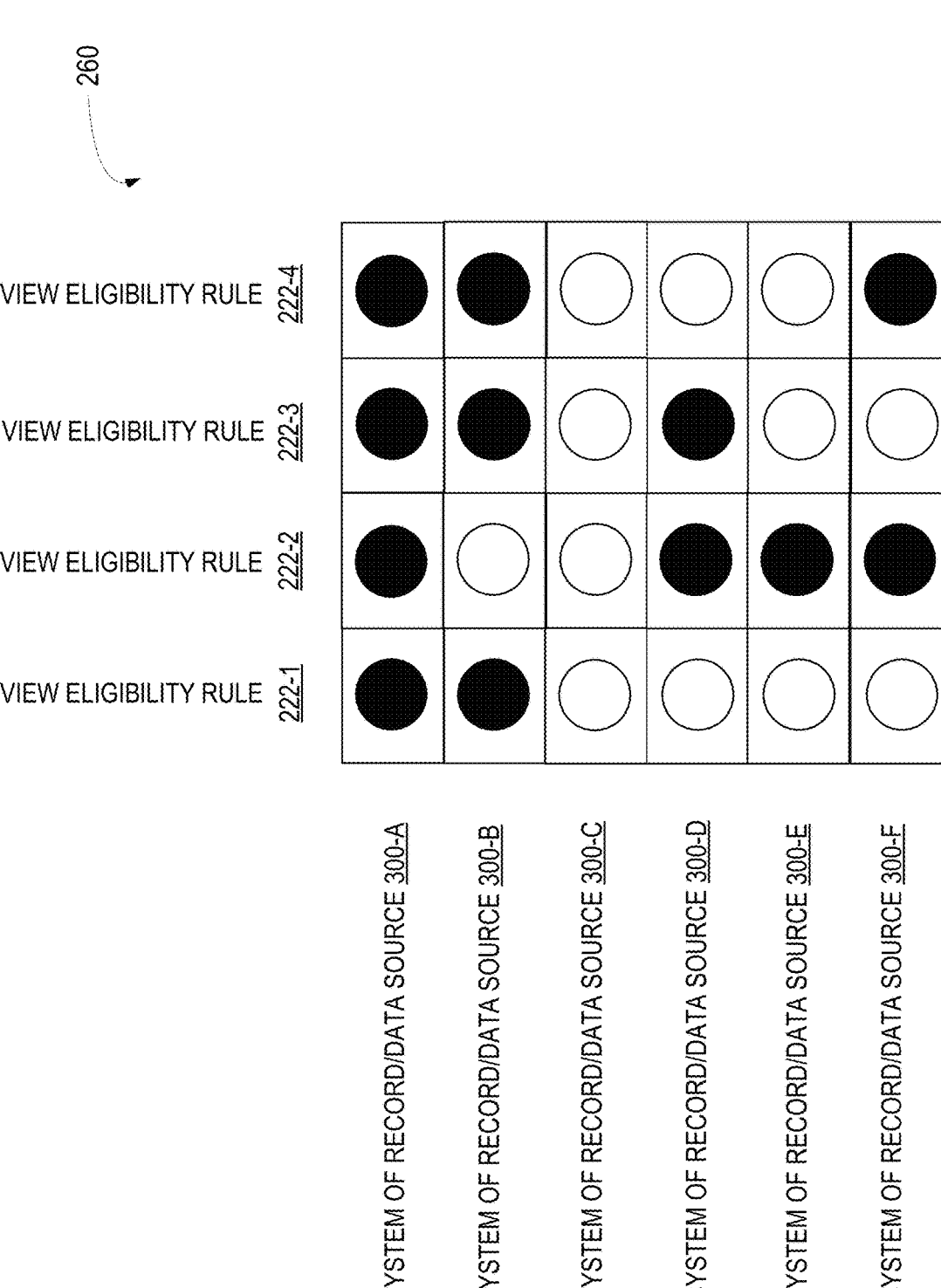
Figure 5:
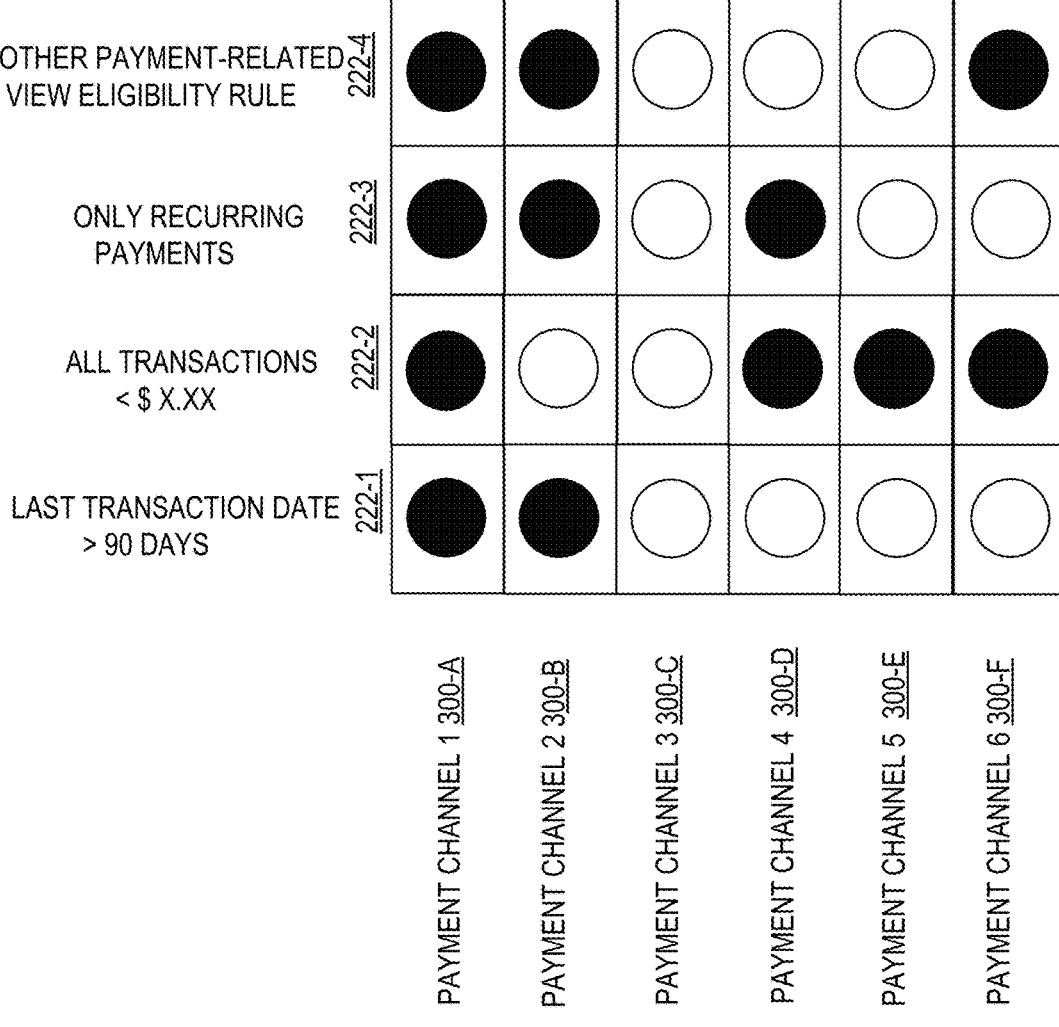

Having thus described embodiments of the disclosure in general terms, reference will now be made to the accompanying drawings, wherein:

FIG. 1 is a schematic/block of a system for data Systems of Record (SORs) determination, data retrieval, aggregation, and presentation, in accordance with embodiments of the present invention;

FIG. 2 is a schematic/block diagram an alternate system for payment channel SORs determination, payment data retrieval, payment data aggregation and presentation, in accordance with embodiments of the present invention;

FIG. 3 is a block diagram of a computing platform storing a data activity application configured for data SORs determination, data retrieval, aggregation, and presentation in accordance with embodiments of present invention;

FIG. 4 is an exemplary and generic data view eligibility matrix, in accordance with embodiments of the present invention;

FIG. 5 is an exemplary payment channel view eligibility matrix, in accordance with embodiments of the present invention; and FIG. 6 is a flow diagram of a method for data SORs determination, data retrieval, aggregation, and presentation in accordance with embodiments of present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product, or a combination of the foregoing. Accordingly, embodiments of the present invention may take the form of an entirely hardware embodiment, an entirely software embodiment (including firmware, resident software, micro-code, a.), or an embodiment combining software and hardware aspects that may be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for conducting operations of embodiments of the present invention may be written in an object oriented, scripted, or unscripted programming language such as JAVA, PERL, SMALLTALK, C++, PYTHON, or the like. However, the computer program code/computer-readable instructions for conducting operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to conduct an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

"Computing platform" or "computing device" as used herein refers to a networked computing device within the computing system. The computing platform includes a processor, a non-transitory storage medium (i.e., memory), a communications device, and a display. The computing platform may be configured to support user logins and inputs from any combination of similar or disparate devices. Accordingly, the computing platform includes servers, personal desktop computer, laptop computers, mobile computing devices and the like.

Thus, systems, apparatus, and methods are described in detail below that provides for a data activity application, which, based on user-selected view eligibility rules, determines which Systems of Record (SORs) to retrieve data from and, in response to data retrieval, subsequently aggregates the data from those SORs and presents the aggregated view of the data to the user. In this regard, since only those SORs that meet the user-selected view eligibility rules are subject to back-end network calls for purpose of data retrieval, performance and capacity issues, otherwise experienced when the data activity application is configured to conduct back-end network calls to all available SORs for each user, are lessened.

The invention relies on a view eligibility matrix stored in the user settings of the data activity application, which lists all of the available SORs and the selectable view eligibility rules associated with each available SORs. In this regard, users may engage one or more of the view eligibility rules to provide criteria as when data should be retrieved from a SOR (and subsequently aggregated and presented in aggregated view to the user. In specific instances, the view eligibility rules may be related to one or more of (i) last date data was created, (ii) minimum requirements as data value, and (iii) scheduled/recurring generation of data and the like.

In addition, the user may be provided with override options in which the user selects from those SORs that have otherwise been excluded from data retrieval based on application of the view eligibility rules and, in response to selection, such data is retrieved from such SORs and included in the data aggregation and subsequent aggregated view presentation. In addition, machine learning may be implemented to learn, over time, user patterns in selecting override options and the user patterns may be the basis for retrieving data from those SORs included in the user pattern (and included such retrieved data in the data aggregation and subsequent presentation of the aggregated view).

In addition, prior to the user selecting view eligibility rules for each SOR, the invention may provide for user-specific preset settings, in which system-configured SORs are selected based on the importance weighting of data attributes (i.e., which data is deemed to be of most importance/significance to the user).

In specific embodiments of the invention, the data activity application is a financial payment activity center application configured to present a user an aggregated view of payment activity from a plurality of SORs associated with different payment channels. In such embodiments of the invention, the view eligibility rules may be stored in the user settings of the financial payment activity center application in the form of a view eligibility matrix that lists all of the different available payment channels and selectable rules for each payment channels. In specific embodiments of the invention, the rules for each payment channel may include, but are not limited to, last payment transaction exceeding a specified past date/number of days, payment transaction(s) falling below a predetermined transaction value, payment transactions limited to recurring/scheduled payments and the like.

Referring to FIG. 1, a schematic/block is presented of a system 100 for data aggregation and presentation, in accordance with embodiments of the present invention. The system 100 is implemented amongst a distributed communication network 110, which may include the Internet, one or more intranets, cellular network(s) or the like. The system includes a computing platform 200, which may comprise one, or as is shown in FIG. 1, a mobile device or any other computing device with network communication capabilities the like. Computing platform 200 includes memory 202, one or more computing processor devices 204 in communication with 202 and one or more Application Programming Interfaces (APIs) 206 in communication with the computing processor devices 202.

Memory 202 of computing platform 200 stores a data activity application 210, which is executable by at least one of the computing processor device(s) 204. Data activity application 210 includes data aggregation engine 220 that is configured to, in response to a user successfully logging into the data activity application 210, determine at least two Systems of Record (SORs)/data sources 300-1 from amongst a plurality of SORs/data sources 300 for conducting back-end network calls to retrieve user data 302 therefrom based on user-selected/configured data view eligibility rules 222 for each of the plurality of SORs 300. In the illustrated example shown in FIG. 1 the SORs/data sources 300 including four SORs/data sources 300-A, 300-B, 300-C, 300-D. However, those of ordinary skill in the art will appreciate that more or less SORs/data sources 300 may comprise the plurality of SORs/data source 300. As described infra. in relation to FIGS. 3-5, the data view eligibility rules may be stored in a data view eligibility matrix, which is configured to allow the user to select applicable rules for each of the SORs/data sources.

In response to SORs/data sources 300 determination, data aggregation engine 220 is configured to implement application programming interfaces 206 to conduct the back-end network calls to the at least two SORs 300-1 and retrieve the user data 302 therefrom. In those instances/embodiments of the invention in which the at least two SORs 300-1 is less than the total plurality of the SORs/data sources 300, the invention serves to lessen the number of back-end network calls and, thus, mitigate problems related to network congestion caused by a high volume of back-end network calls. Once the user data 302 has been retrieved, data aggregation engine 220 is configured to aggregate (e.g., combine, reformat and the like) the data 302 into a single dataset (i.e., aggregated data 302-1).

Data activity application 210 additionally includes a data presentation engine 230 which is configured to receive the aggregated data 302-1 from the data aggregation engine 220 and, in response, generate, and present within the data activity application 210, a graphical user interface (GUI) 232 that provides an aggregated view 234 of the data 302-1.

Referring to FIG. 2, a schematic/block is presented of a system 100-1 for data aggregation and presentation, in accordance with specific embodiments of the present invention. Specifically, in those embodiments illustrated in FIG. 2, the data activity application 210 is payment activity application 210 and the SORs/data sources 300 are associated with various different payment channels. As such, the data aggregation engine 220 is configured to determine at least two payment channel Systems of Record (SORs)/data sources 300-1 from amongst a plurality of payment channel SORs/data sources 300 for conducting back-end network calls to retrieve user payment transaction data 302 therefrom based on user-selected/configured payment channel view eligibility rules 222 for each of the plurality of payment channel SORs/data sources 300. In response to payment channel SORs/data sources 300 determination, data aggregation engine 220 is configured to implement application programming interfaces 206 to conduct the back-end network calls to the at least two payment channel SORs 300-1 and retrieve the user payment transaction data 302 therefrom. Once the user payment transaction data 302 has been retrieved, data aggregation engine 220 is configured to aggregate (e.g., combine, reformat and the like) the payment transaction data 302 into a single dataset (i.e., aggregated data 302-1). Further, the data presentation engine 230 is configured to receive the aggregated payment transaction data 302-1 from the data aggregation engine 220 and, in response, generate, and present within the data activity application 210, a graphical user interface (GUI) 232 that provides an aggregated view 234 of the user's payment transaction data 302-1.

Referring to FIG. 3, a block diagram is depicted of computing platform 200 highlighting various alternate embodiments of the system 100 shown and described in relation to FIG. 1, in accordance with embodiments of the present invention. Computing platform 200 may comprise one or multiple computing devices, such mobile devices, PCs or the like. As previously discussed in relation to FIG. 1, computing platform 200 includes memory 202, which may comprise volatile and/or non-volatile memory, such as read-only memory (ROM) and/or random-access memory (RAM), EPROM, EEPROM, or any memory common to computing platforms. Moreover, memory 202 may comprise cloud storage, such as provided by a cloud storage service and/or a cloud connection service.

Further, computing platform 200 includes one or more computing processor devices 204, which may be an application-specific integrated circuit ("ASIC"), or other chipset, logic circuit, or other data processing device. Computing processor device(s) 204 may execute one or more application programming interface (APIs) 206 that interface with any resident programs, such as data aggregation engine 220 or the like, stored in memory 202 of computing platform 200 and any external programs. Computing platform 200 includes various processing sub-systems (not shown in FIG. 3) embodied in hardware, firmware, software, and combinations thereof, that enable the functionality of computing platform 200 and the operability of computing platform 200 on a distributed communication network, such as distributed communication network 110 shown in FIG. 1. For example, processing sub-systems allow for initiating and maintaining communications and exchanging data with other networked devices. For the disclosed aspects, processing sub-systems of computing platform 200 includes any processing subsystem portion used in conjunction with data activity application 210, tools, routines, sub-routines, applications, sub-applications, sub-modules thereof.

In specific embodiments of the present invention, computing platform 200 additionally includes a communications module (not shown in FIG. 3) embodied in hardware, firmware, software, and combinations thereof, that enables electronic communications between components of computing platform 200 and other networks and network devices. Thus, communication module includes the requisite hardware, firmware, software and/or combinations thereof for establishing and maintaining a network communication connection with one or more devices and/or networks. In the present invention, communication module is configured to work in conjunction with the APIs 206 to retrieve the user data from the SORs/data sources 300.

As previously discussed in relation to FIG. 1, memory 202 stores data activity application 210, which is executable by at least one of the computing processor device(s) 204. As previously discussed in relation to FIG. 2, in specific embodiments of the invention, data activity application 210 is a payment activity application configured to present to a user recent payment transaction activity from various payment channels.

As a precursor to view eligibility rule 304 implementation, data activity application is configured to continually receive feedback 240 from the plurality of SORs/data sources 242. The feedback 240 includes data attributes 242 which include or otherwise indicate (i) a data of last datum generation/entry 244, (ii) a value of datum including the highest value datum of a predetermined time period 246 and (iii) scheduled/recurring datum entries 248.

Data activity application 210 includes data aggregation engine 220. In specific embodiments of the invention, prior to user selection of view eligibility rules 304, data aggregation engine 220 is configured to operate in a preset mode 240, in which SORs/data sources 300-1 are determined, from amongst the plurality of SORs 300, based on the data attributes 242 in the feedback 240 received from the SORs/data sources 300. In this regard, the user importance weightage 242 may be assigned to specific datum associated with data attributes to determine which SORs/data sources 300-1 to retrieve data 302 from. In the preset mode 240, user importance weightage 242 implies that certain data which meets certain criteria is typically more or less important to a user and, thus, may be determinative in deciding which SORs/data sources to retrieve from.

As previously discussed in relation to FIG. 1, data aggregation engine 220 is configured to, in response to a user successfully logging into the data activity application 210, determine at least two Systems of Record (SORs)/data sources 300-1 from amongst a plurality of SORs/data sources 300 for conducting back-end network calls to retrieve user data 302 therefrom based on user-selected/configured data view eligibility rules 222 for each of the plurality of SORs 300. The data view eligibility rules may be stored in a data view eligibility matrix 260 (examples of which are shown and discussed in relation to FIGS. 4-5), which is configured to allow the user to select applicable rules for each of the SORs/data sources. In specific embodiments of the invention, the view eligibility rules 232 in the matrix 260 are related to, but are not limited in relation to, (i) the data of the datum 232-1, (ii) the value of the datum and (iii) the schedule for datum entry/occurrence.

It should be noted, that in specific embodiments of the invention, the data activity application 210 is configured to provide for a user option 250 in which the user can override the determination of at least two Systems of Record (SORs)/data sources 300-1 based on the view eligibility rules and select further SORs/data source 300-2 for data retrieval, aggregation and subsequently aggregated view presentation. Such a selection of further SORs/data sources may occur at any point in time (i.e., prior to the determination of at least two Systems of Record (SORs)/data sources 300-1 based on the view eligibility rules, or after aggregated view presentation (thus, resulting in re-aggregation of the data). Moreover, the user option 250 may provide for the user to further filter the SORs/data sources 300 from which data is to be retrieved, aggregated, and presented (i.e., select less SORs/data sources than the determined at least two Systems of Record (SORs)/data sources 300-1).

In response to SORs/data sources 300 determination, data aggregation engine 220 is configured to implement application programming interfaces 206 to conduct the back-end network calls to the at least two SORs 300-1 and retrieve the user data 302 therefrom. In those instances/embodiments of the invention in which the at least two SORs 300-1 is less than the total plurality of the SORs/data sources 300, the invention serves to lessen the number of back-end network calls and, thus, mitigate problems related to network congestion caused by a high volume of back-end network calls. Once the user data 302 has been retrieved, data aggregation engine 220 is configured to aggregate (e.g., combine, reformat and the like) the data 302 into a single dataset (i.e., aggregated data 302-1).

In such embodiments of the invention, the data activity application 210 and/or data aggregation engine may implement machine learning techniques (not shown in FIG. 3) to learn, over time, a user pattern of selection of the further SORs/data sources 300-2. In such embodiments of the invention, the data aggregation engine 220 is further configured to receive the user pattern, and, implement the Application Programming Interfaces (APIs) 206 to conduct further back-end network calls to the one or more further SORs/data sources 300-2 in the user pattern and retrieve data therefrom, and aggregate the data retrieved from both (i) the at least two SORs/data sources 300-1 (based on the view eligibility rules 304) and (ii) the one or more further SORs 300-2 in the user pattern.

As discussed in relation to FIG. 1, data activity application 210 additionally includes a data presentation engine 230 which is configured to receive the aggregated data 302-1 from the data aggregation engine 220 and, in response, generate, and present within the data activity application 210, a graphical user interface (GUI) 232 that provides an aggregated view 234 of the data 302-1.

Referring to FIG. 4, an exemplary view eligibility matrix 260 is shown, in accordance with embodiments of the invention. The vertical or y-axis depicts various SORs/data sources 300-A, 300-B, 300-C, 300-D, 300-E, and 300-F, while the horizontal or x-axis depicts four different view eligibility rules 222-1, 222-2, 222-3 and 224-4. One of ordinary skill in the art will appreciate that the matrix 260 may be configured with more or less SORs/data sources 300 and view eligibility rules 22 and, as such, as new/emerging SORs/data sources 300 are made available or as new view eligibility rules 222 become applicable they may readily be added to the matrix.

The view eligibility matrix 260 may stored in the user settings portion of the data activity application and, in the illustrated embodiment of FIG. 4, is configured with checkboxes for user to select and/or deselect applicable view eligibility rules for each SOR/data source 300. In the illustrated example of FIG. 4, the user has selected all of the available view eligibility rules 222-1, 222-2, 222-3 and 224-4 for SOR/data source 300-A. This means that SOR/data source 300-A has the most constraints on data retrieval and, thus aggregation and subsequent presentation. Further, the user has not selected any of the available view eligibility rules 222-1, 222-2, 222-3 and 224-4 for SOR/data source 300-A. This means that SOR-data source 300-B is not subjected to any constraints on data retrieval and, thus, data this SOR/data source will always be retrieved, aggregated, and subsequently presented. The preset mode (i.e., prior to user selection of view eligibility rules) may be leave all checkboxes unchecked, which means that data from all SORs/data sources will always be retrieved, aggregated, and subsequently presented until the user applies view eligibility rules to applicable SORs/data sources 300.

In specific embodiments of the invention, specific rules may not be applicable to a given SOR/data source. In such embodiments of the invention, the checkbox in the view eligibility matrix 260 may be greyed-out to indicate that the rule is not applicable (i.e., can not be selected by the user) to that specific SOR/data source.

Referring to FIG. 5, an exemplary view eligibility matrix 260 is shown, in accordance with specific embodiments of the invention. The vertical or y-axis depicts various payment channel SORs/data sources 300-A, 300-B, 300-C, 300-D, 300-E, and 300-F, such as financial accounts, bill pay, P2P payment, wires, investment banking, recurring payments and the like. The horizontal or x-axis depicts various payment transaction-related view eligibility rules. For example, rule 222-1 is related to last payment transaction data, specifically, if the last-in-time payment transaction is greater than 90 days, the data is not eligible for presentation/viewing (i.e., the data will not be retrieved and aggregated from the corresponding payment channels). Rule 222-2 is related to payment transaction values, specifically, if all the payment transactions over the specified period of time are below a prescribed amount (i.e., if none of the payment transactions over a specified period of time exceed a prescribed amount), the data is not eligible for presentation/viewing (i.e., the data will not be retrieved and aggregated from the corresponding payment channels). Rule 222-3 is related scheduled and/or recurring payment transaction, specifically, if all the payment transactions over the specified period of time are recurring/scheduled payment transactions, the data is not eligible for presentation/viewing (i.e., the data will not be retrieved and aggregated from the corresponding payment channels). Rule 222-4 is depicted to illustrate that other payment-related view eligibility rules can be added to the matrix and are within the realm of the invention.

Referring to FIG. 6, a flow diagram is depicted of a method 400 for limiting backend network calls within a data aggregation platform, in accordance with embodiments of the present invention. At Event 410, user inputs are received that are configured to login a user to a data activity application, which is configured to present user data activity from more than one data source. In specific embodiments of the method, the data activity application is a payment activity application configured to present user's payment transaction data/history.

In response to successfully logging the user into the data activity application, at Event 420, at least two SORs/data sources from amongst a plurality of SORs/data sources determined for data retrieval (and thus, subsequent aggregation and presentation) based on user-selected view eligibility rules. As previously discussed, the view eligibility rules may be accessible to the user for selection via a data view eligibility matrix that lists the available SORs/data sources and the view eligibility rules. In those embodiments in which the data is payment transaction data, the view eligibility rules may include, but are not limited to, last payment transaction data-related, highest and/or lowest transaction amount-related, type of transaction-related, such as recurring/scheduled payment transaction-related and the like.

In response to data view eligibility rule determination at Event 430, Application Programming Interfaces (APIs) are implemented to conduct backend network calls to the determined at least two SORs/data source and retrieve data from the SORs and, at Event 440, the retrieved data is aggregated (e.g., reformatted, combined and the like).

In response to aggregating the retrieved data, at Event 450, a graphical user interface (GUI) is generated and presented to the user within the data activity application. The GUI provides the user an aggregated view of the previously aggregated data.

Thus, as described in detail above, present embodiments of the invention include systems, methods, computer program products and/or the like that provide for a data activity application, which, based on user-selected view eligibility rules, determines which Systems of Record (SORs) to retrieve data from and, in response to data retrieval, subsequently aggregates the data from those SORs and presents the aggregated view of the data to the user. In this regard, since only those SORs that meet the user-selected view eligibility rules are subject to back-end network calls for purpose of data retrieval, performance and capacity issues, otherwise experienced when the data activity application is configured to conduct back-end network calls to all available SORs for each user, are lessened.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for data aggregation and presentation, the system comprising:
a computing platform including a memory and one or more computing processor devices in communication with the memory, wherein the memory stores:
a data activity application executable by at least one of the one or more computing processor devices, configured to provide a user access to user-specific data and comprising:
a data aggregation engine executable by at least one of the one or more computing processor devices and configured to, in response to the user logging into the data activity application:
determine at least two Systems of Record (SORs) from amongst a plurality of SORs for conducting back-end network calls and data retrieval based on user-selected view eligibility rules for each of the plurality of SORs,
implement Application Programming Interfaces (APIs) to conduct the back-end network calls to the at least two SORs and retrieve data from the at least two SORs, and
aggregate the data retrieved from the at least two SORs; and
a data presentation engine in communication with the data aggregation engine, executable by at least one of the one or more computing processor devices and configured to:
receive the aggregated data from the data aggregation engine, and
generate, and present within the data activity application, a graphical user interface that provides an aggregated view of the aggregated data.

2. The system of claim 1, wherein the data activity application is configured to maintain a data view eligibility matrix within each user setting storage that defines the user-selected view eligibility rules for each of the plurality of SORs.

3. The system of claim 1, wherein the user-selected view eligibility rules include view eligibility rules directed to (i) date of last datum occurrence, (ii) value of datums over a predetermined time period, and (iii) scheduled occurrence of datums over the predetermined time period.

4. The system of claim 3, wherein the data activity application is further configured to continually receive feedback from the plurality of SORs, wherein the feedback includes data attributes that provide for (i) the date of last datum occurrence, (ii) the value of the datums over the predetermined time period, and (iii) the scheduled occurrence of the datums over the predetermined time period.

5. The system of claim 3, wherein the data aggregation engine is further configured to:
prior to the user selecting view eligibility rules, determine at least two system-configured SORs from amongst the plurality SORs for conducting back-end network calls and data retrieval based, at least on, user expected importance weightage assigned to the data attributes;
implement Application Programming Interfaces (APIs) to conduct back-end network calls to the at least two system-configured SORs and retrieve data from the at least two system-configured SORs, and
aggregate the data retrieved from the at least two system-configured SORs.

6. The system of claim 1, wherein the data activity application is further configured to present the user with an option to select one or more further SORs (i) from amongst the plurality of SORs and (ii) not including the at least two SORs, wherein user selection of the one or more further SORs is configured to cause the data aggregation engine to implement Application Programming Interfaces (APIs) to conduct further back-end network calls to the one or more further SORs and retrieve data from the one or more further SORs, and aggregate the data retrieved from (i) the at least two SORs and (ii) the one or more further SORs.

7. The system of claim 6, wherein the data activity application further comprises machine learning techniques that are configured to learn, over time, a user pattern of selection of one or more further SORs and, wherein the data aggregation engine is further configured to receive the user pattern, and, in response to the user logging into the data activity application, implement Application Programming Interfaces (APIs) to conduct further back-end network calls to the one or more further SORs in the user pattern and retrieve data from the one or more further SORs in the user pattern, and aggregate the data retrieved from (i) the at least two SORs and (ii) the one or more further SORs in the user pattern.

8. A computer-implemented method for data aggregation and presentation, the computer-implemented is method executed by one or more computing processor devices and comprises:
receiving inputs configured to login a user to a data activity application;
in response to logging the user into the data activity application, determining at least two Systems of Record (SORs) from amongst a plurality of SORs for conducting back-end network calls and data retrieval based on user-selected view eligibility rules for each of the plurality of SORs;
implementing Application Programming Interfaces (APIs) to conduct the back-end network calls to the at least two SORs and retrieve data from the at least two SORs;
aggregating the data retrieved from the at least two SORs;
generating, and presenting within the data activity application, a graphical user interface that provides an aggregated view of the aggregated data.

9. The computer-implemented method of claim 8, wherein determining at least two SORs further comprises accessing, within a user setting storage, a data view eligibility matrix to determine the view eligibility rules for each of the plurality of SORs based on user-selected settings in the data view eligibility matrix.

10. The computer-implemented method of claim 8, wherein determining the at least two SORs further comprises determining the at least two SORs from amongst the plurality of SORs for conducting back-end network calls and data retrieval based on user-selected view eligibility rules, wherein the user-selected view eligibility rules include view eligibility rules directed to (i) date of last datum occurrence, (ii) value of datums over a predetermined time period, and (iii) scheduled occurrence of datums over the predetermined time period.

11. The computer-implemented method of claim 10, further comprising:

continually receiving feedback from the plurality of SORs, wherein the feedback includes data attributes that provide for (i) the date of last datum occurrence, (ii) the value of the datums over the predetermined time period, and (iii) the scheduled occurrence of the datums over the predetermined time period.

12. The computer-implemented method of claim 11, wherein the prior to the user selecting view eligibility rules, determining at least two system-configured SORs from amongst the plurality SORs for conducting back-end network calls and data retrieval based, at least on, user expected importance weightage assigned to the data attributes;

implementing Application Programming Interfaces (APIs) to conduct back-end network calls to the at least two system-configured SORs and retrieve data from the at least two system-configured SORs, and aggregating the data retrieved from the at least two system-configured SORs.

13. The computer-implemented method of claim 8, further comprising:

receiving a user input that selects one or more further SORs (i) from amongst the plurality of SORs and (ii) not included in the at least two SORs; and implementing Application Programming Interfaces (APIs) to conduct further back-end network calls to the one or more further SORs and retrieve data from the one or more further SORs, and wherein aggregating further comprises aggregating the data retrieved from (i) the at least two SORs and (ii) the one or more further SORs.

14. The computer-implemented method of claim 13, further comprising:

implementing machine learning techniques to learn, over time, a user pattern of selection of one or more further SORs; and in response to logging the user into the data activity application, implementing Application Programming Interfaces (APIs) to conduct further back-end network calls to the one or more further SORs in the user pattern and retrieve data from the one or more further SORs in the user pattern, and wherein aggregating further comprises aggregating the data retrieved from (i) the at least two SORs and (ii) the one or more further SORs in the user pattern.

15. The computer-implemented method of claim 13, wherein the sets of codes further comprise sets of codes for causing the one or more computing devices to:

implement machine learning techniques to learn, over time, a user pattern of selection of one or more further SORs; and in response to logging the user into the data activity application, implement Application Programming Interfaces (APIs) to conduct further back-end network calls to the one or more further SORs in the user pattern and retrieve data from the one or more further SORs in the user pattern, and wherein the set of codes for causing the one or more computing devices to aggregate are further configured to cause the one or more computing devices to aggregate the data retrieved from (i) the at least two SORs and (ii) the one or more further SORs in the user pattern.

16. A computer program product including a non-transitory computer-readable medium, the non-transitory computer-readable medium comprising sets of codes for causing one or more computing devices to:

receive inputs configured to login a user to a data activity application;

in response to logging the user into the data activity application, determine at least two Systems of Record (SORs) from amongst a plurality of SORs for conducting back-end network calls and data retrieval based on user-selected view eligibility rules for each of the plurality of SORs;

implement Application Programming Interfaces (APIs) to conduct the back-end network calls to the at least two SORs and retrieve data from the at least two SORs;

aggregate the data retrieved from the at least two SORs;

generate, and present within the data activity application, a graphical user interface that provides an aggregated view of the aggregated data.

17. The computer program product of claim 16, wherein the set of codes for causing the one or more computing devices to determine at least two SORs are further configured to cause the one or more computing devices to access, within a user setting storage, a data view eligibility matrix to determine the view eligibility rules for each of the plurality of SORs based on user-selected settings in the data view eligibility matrix.

18. The computer program product of claim 16, wherein the set of codes for causing the one or more computing devices to determine at least two SORs are further configured to determine the at least two SORs from amongst the plurality of SORs for conducting back-end network calls and data retrieval based on user-selected view eligibility rules, wherein the user-selected view eligibility rules include view eligibility rules directed to (i) date of last datum occurrence, (ii) value of datums over a predetermined time period, and (iii) scheduled occurrence of datums over the predetermined time period.

19. The computer program product of claim 16, wherein the sets of codes further comprise sets of codes for causing the one or more computing devices to:

prior to the user selecting view eligibility rules, determine at least two system-configured SORs from amongst the plurality SORs for conducting back-end network calls and data retrieval based, at least on, user expected importance weightage assigned to the data attributes;

implement Application Programming Interfaces (APIs) to conduct back-end network calls to the at least two system-configured SORs and retrieve data from the at least two system-configured SORs, and aggregate the data retrieved from the at least two system-configured SORs.

20. The computer program product of claim 16, wherein the sets of codes further comprise sets of codes for causing the one or more computing devices to:

receive a user input that selects one or more further SORs (i) from amongst the plurality of SORs and (ii) not included in the at least two SORs; and

19 implement Application Programming Interfaces (APIs) to conduct further back-end network calls to the one or more further SORs and retrieve data from the one or more further SORs, and wherein the set of codes for causing the one or more computing devices to aggregate are further configured to cause the one or more computing devices to aggregate the data retrieved from (i) the at least two SORs and (ii) the one or more further SORs.

* * * * *